(No Model.)
W. G. NELSON.
CHUCK.
No. 497,986. Patented May 23, 1893.
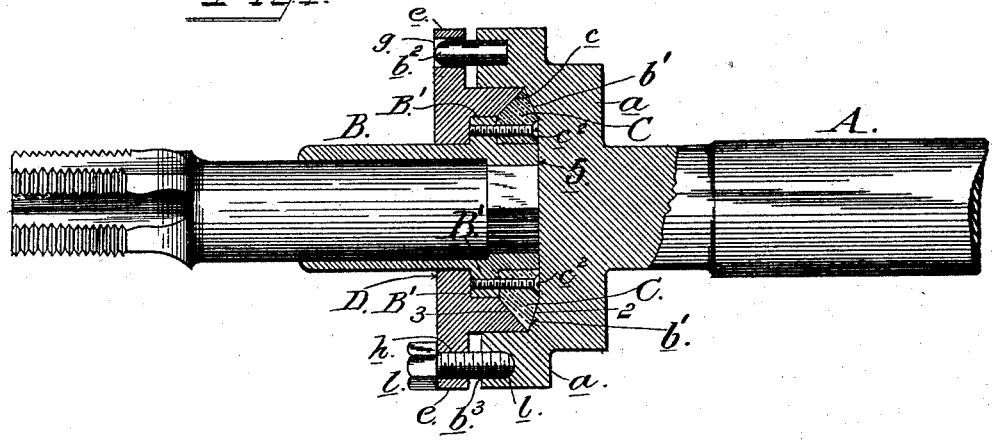
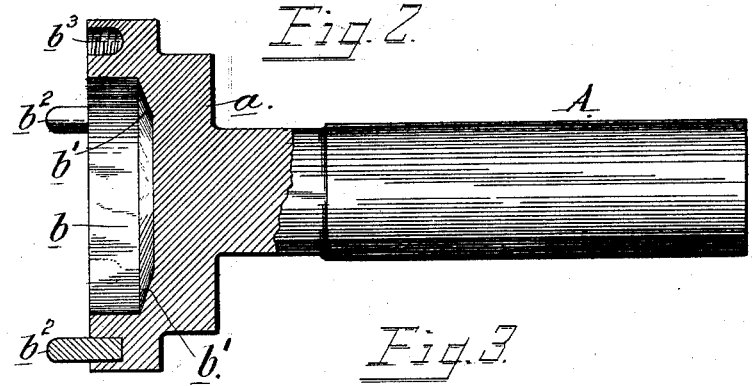
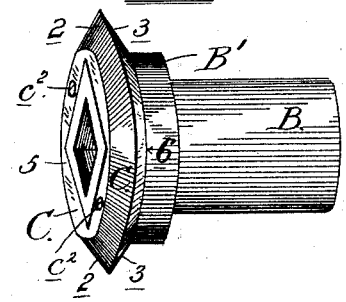
WITNESSES
Thos. J. Raut Jr.
Chapman W. Fowler.
INVENTOR
William G. Nelson,
by A. H. Evans & Co
Attorneys

UNITED STATES PATENT OFFICE.

WILLIAM G. NELSON, OF BROOKLYN, NEW YORK, ASSIGNOR OF ONE-HALF TO ALFRED A. FISHER, OF SAME PLACE.

CHUCK.

SPECIFICATION forming part of Letters Patent No. 497,986, dated May 23, 1893.

Application filed August 12, 1892. Serial No. 442,924. (No model.)

*To all whom it may concern:*

Be it known that I, WILLIAM G. NELSON, a citizen of the United States, residing at Brooklyn, in the county of Kings and State of New York, have invented certain new and useful Improvements in Chucks, as set forth in the accompanying drawings, forming part of this specification, in which—

Figure 1, represents a longitudinal sectional view of a chuck embodying my invention. Fig. 2, is a sectional view of the inner end of the body or driving spindle. Fig. 3, is a perspective view of the inner end of the chuck showing the friction piece.

My invention relates to chucks, and has especial reference to drill chucks and others of the class used in machines for boring, tapping and similar purposes, and my invention consists of the constructions and combinations of devices which I shall hereinafter fully describe and claim.

In machines of the character mentioned, the chuck is usually rigidly fitted to the drive spindle, and consequently, when employed for tapping, it becomes necessary, as the tap approaches the bottom of the hole, to so regulate the stopping of the machine as to prevent the tap from striking the bottom and receiving the full power transmitted through the spindle, which would result in the breaking of the tap, or the derangement of the driving mechanism. Even the exercise of the greatest care does not avoid these difficulties, and therefore it has been found expedient to provide a chuck in which the tool holder is held by friction to the inner end of the spindle and is adapted to yield under a predetermined force to remove the strain from the chuck and its actuating mechanism.

Another great drawback to the form of chucks now in use, is the tendency of the meeting surfaces of the two-part chuck to wear unevenly thereby throwing the point of the tool out of center to the great detriment of the work and the liability of breaking the tool.

The object of my invention is to overcome these difficulties and especially to provide a two-part chuck whose meeting surfaces form beveled seats, which always insures the perfect centering of the tool.

Referring to the accompanying drawings for a more complete explanation of my invention, A represents a drill spindle or driver to which the chuck is to be attached. The inner end of this spindle is provided with an enlarged head $a$ suitably recessed at $b$ to receive the inner end of the chuck, and provided at the base of the recess with an inwardly inclined seat $b'$ as shown particularly in Fig. 2. From the face of the head $a$ project suitable pins $b^2$ and said head, at points between these pins, is provided with threaded holes $b^3$ for a purpose hereinafter stated.

The chuck consists of a cylindrical or other socket piece B into which the shank of the tool is inserted in the usual manner, and said socket is preferably made square at its inner end and is provided with a collar B'. A hard-rubber, paper, or fibrous friction-piece C is fitted upon the inner squared end of the socket piece and is securely held by screws $c^2$ passing through it and entering the collar B', the said friction-piece being of disk form having its opposite faces 5 and 6 flat and parallel for a portion of its width, and its remaining surface tapered on both sides at 2 and 3 to impart to the edge of the friction-piece a V-shape in cross section. When the two parts of the chuck are in position the flat face 5 of the friction piece C, will find a seat against a corresponding surface at the base of the recess in the head $a$, and the beveled surface 2 will be seated against the beveled or inclined portion $b'$ of said head. The opposite beveled face 3 of the friction piece C, will also be engaged by a similarly formed inwardly-tapered seat $c$ on the inner face of the clamping disk D the said disk having also its inner face recessed to receive the collar B' on the socket piece B, and having its flange $e$ provided with holes $g$ and $h$, the former being adapted to receive the pins $b^2$ for locking the two parts of the chuck against lateral twisting strain, while the holes $h$ receive threaded bolts or screws $l$ which engage the holes $b^3$ in the head $a$ as shown. From this description it will be seen that the two main parts of the chuck are securely clamped together by screwing the disk D to the head and the frictional contact between the spindle and socket piece is such that the two move together as one piece until the strain or resistance upon the tool overcomes the frictional contact and allows the spindle to slip upon the friction piece carried by the socket. As the socket which carries the tool also carries the beveled friction piece C and this piece C works upon the beveled seats before mentioned, it is manifest that whatever wear there may be between this piece and its seats may be compensated for by adjusting the clamping disk, and that, owing to the beveled arrangement of the friction piece and its seats, the tool is also properly centered, a feature that is not capable in those chucks where the disks are plain flat pieces of uniform thickness which, after slight wear must be built up by inserting wedges or other pieces to properly center the tool.

Having thus described my invention, what I claim as new, and desire to secure by Letters Patent, is—

1. In a chuck, the driver having a recessed head provided with an inclined or tapered seat, a tool holder having a friction piece adapted to enter said head and provided with tapered edge fitting said seat, a clamping piece having a tapered or beveled seat adapted to receive a corresponding beveled or tapered portion on the opposing face of the friction piece, and means for uniting the clamping piece to the driver, substantially as herein described.

2. In a chuck, the combination of the body piece for attachment to the driver, having a recessed head with beveled seat, said head having the projecting pins and holes, a socket piece carrying the tool, and provided with a collar, a friction piece secured to said collar and having its faces oppositely beveled, a clamping piece having a recess for said collar and a beveled seat, said clamping piece having also holes to receive the pins on the body piece, and screws or bolts for securing the body piece and socket piece together, substantially as herein described.

WILLIAM G. NELSON.

Witnesses:
A. A. FISHER,
EDW. E. BOWNS.